Figure 1:
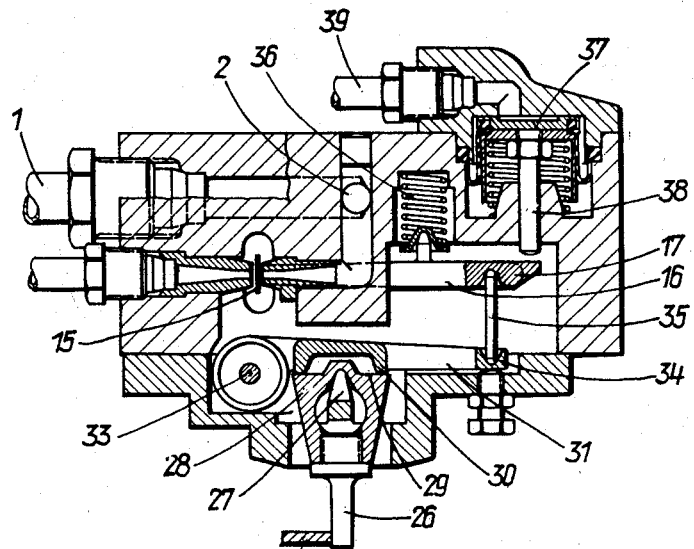

Inventor
Alois Moosmann
By Watson, Cole, Grindle + Watson
Attys.

United States Patent Office 3,082,781
Patented Mar. 26, 1963

3,082,781
PNEUMATIC CONTROL MECHANISM FOR MACHINE TOOLS
Alois Moosmann, 11 Muttergartenweg,
Stuttgart-Birkach, Germany
Filed Sept. 8, 1960, Ser. No. 54,646
Claims priority, application Germany Sept. 11, 1959
6 Claims. (Cl. 137—83)

This invention relates to a pneumatic control mechanism for machine tools or the like.

For the automation of operations with machine tools the requirement arises for very exactly controlling and limiting the movement of tool slides or other machine parts. The dimensions of a workpiece to be treated must be ascertained very exactly in order to control the working movement of the tool slide. In copying devices the movements of a slide must be very exactly controlled in accordance with a template or in accordance with the contours of a model. The movement of the slide is generally effected by means of oil cylinders with pistons, by oil-operated motors or more recently by oil-operated turbines. In the case of oil cylinders and oil motors static oil pressure serves as the source of driving energy. In turbines operated by oil under pressure there is used a jet of oil of high velocity, that is to say kinetic energy of flow is used for the dynamic driving of turbine rotors.

In all static drives it is difficult to adjust the control pistons to very small quantities of oil. Further it is difficult to obtain the desired rapid speed of response of the control mechanism. Frequently long pipes or flexible conduits are necessary between the control mechanism and the controlled parts. In these pipes and the like the elasticity of the pressure medium has an unfavourable effect.

In the known pneumatic control devices the controlled air pressure acts against the action of a return spring on a control piston subjected to oil pressure. For the purpose of displacing the control piston therefore there must exist in the pneumatic control duct a pressure increase corresponding to the characteristic of the return spring. This has the disadvantage that variation of pressure in the control duct requires time and causes disturbances in the compressed air supply system. The exactness of control is thereby reduced.

The object of the invention is to overcome these disadvantages associated with the drive of tool slides or other machine parts by static oil pressure, and in the case of dynamic drives by oil turbines to ensure the necessary impulse speed and to amplify the impulses themselves.

The invention consists essentially in that the compressed air does not operate against the action of a return spring but that both the working displacement and also the return movement of the controlled parts are effected by compressed air in such manner that with an increase in pressure on one side of the control system there is simultaneously a reduction in pressure on the other side of the control system.

For the simultaneous increase and reduction in the two control pressures to be beneficial the two operations of pressure increase and pressure reduction must take place wholly analogously on the two sides of the control system.

Preferably there is employed for this purpose in accordance with the invention a mechanism in which a movable control member with a surface is arranged between two supply nozzles and two opposed receiving nozzles. This control member is provided with two oppositely directed control edges which lie on a straight line. The control member is preferably arranged on the free end of a pivotal lever at an angle of 90° to the lever axis. Such a control member can be controlled very easily and exactly by pressure impulses or by mechanical means e.g. by the feeler device of a copying machine.

An embodiment of the invention is illustrated in the accompanying drawing in relation to the control mechanism of a copying machine.

Figure 2:
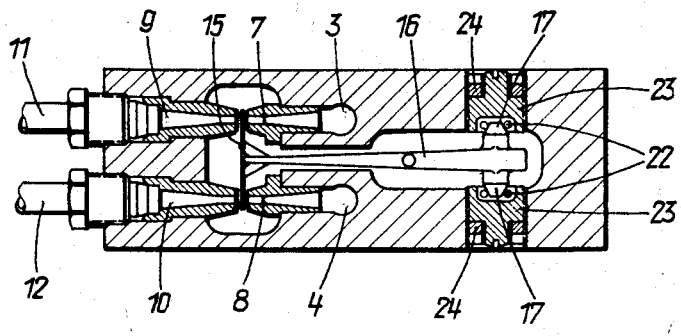
Figure 3:
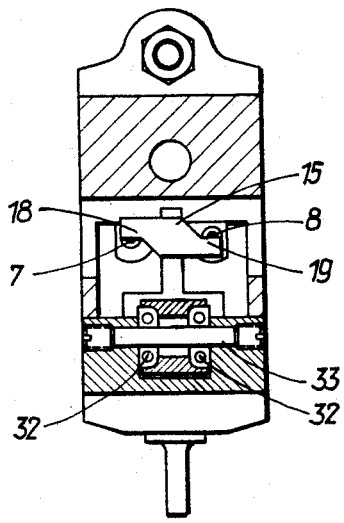
Figure 4:
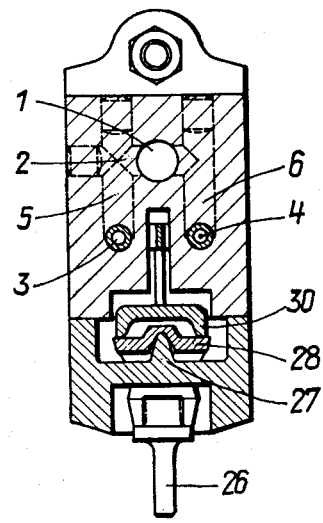
Figure 5:
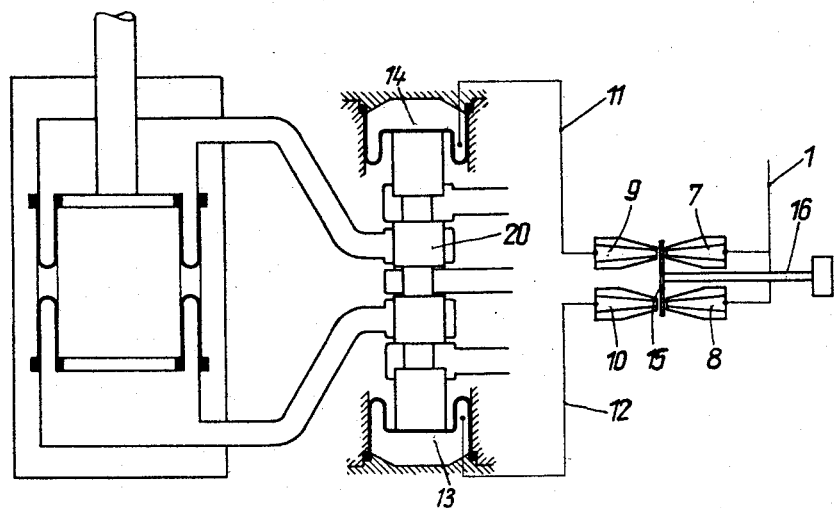
Figure 6:
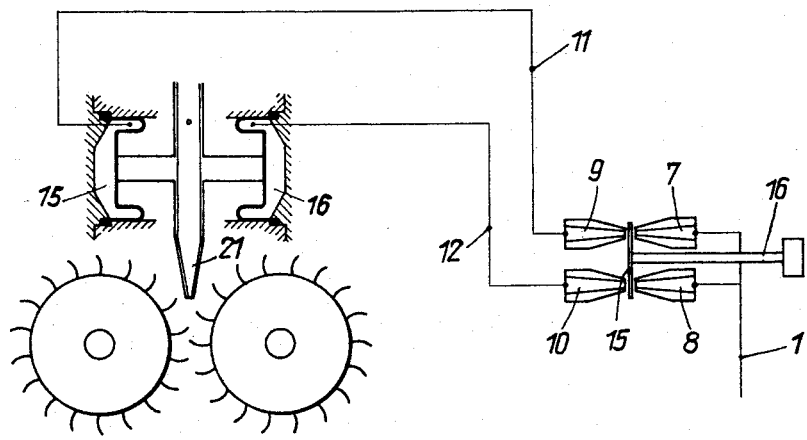

FIG. 1 is a longitudinal section of the control mechanism providing the impulse, FIG. 2 is an underplan view of the control mechanism, FIG. 3 shows the control mechanism in cross section, FIG. 4 is a further cross sectional view of the control mechanism, FIG. 5 shows diagrammatically an example of control mechanism for the static drive of a slide by means of an oil-operated cylinder, and FIG. 6 shows diagrammatically an example of control mechanism for the dynamic drive of a slide by means of a pressure oil turbine.

In the control mechanism illustrated in FIGS. 1 to 4, compressed air flows at approximately constant pressure through a pipe connection 1 into the transverse bore 2 of the mechanism whence it is distributed to the two nozzle bores 3 and 4 by the bores 5 and 6. In the two nozzle bores 3 and 4 are located the two supply nozzles 7 and 8 (FIG. 2). The air flows through these supply nozzles and then into opposed receiving nozzles 9 and 10 where it generates a pressure which is approximately as high as the pressure in the supply nozzles 7 and 8. The two pipe connections 11 and 12 of the mechanism lead for example to the ends 13 and 14 of a control piston 20 in an oil cylinder (FIG. 5) or for example to the two adjusting pistons 15 and 16 of the nozzle 21 of a turbine operated by oil under pressure (FIG. 6).

Between the supply nozzles 7 and 8 and the receiving nozzles 9 and 10 is inserted a movable control member formed by a vane 15 which is secured to a lever 16. The vane 15 is preferably made from thin sheet metal. The lever 16 can be swung about its bearing axis 17. The vane 15 has two control edges 18 and 19 (FIG. 3) which lie on a straight line but are so mutually offset or arranged in reverse directions that for example upon a movement of the vane 15 upwardly in FIG. 3 the flow area between the nozzles 7 and 9 increases and the flow area between the nozzles 8 and 10 decreases to the same extent. With the variation of the flow area the pressure in the receiving nozzles 9 and 10 and therefore in the pipe connections 11 and 12 is also varied. This pressure variation brings about a very rapid adjustment of the control piston 20 (FIG. 5) or of the nozzle 21 (FIG. 6). Since the pressure on one side of the control system falls to the same extent as it rises on the other side, the control mechanism operates very rapidly.

The arrangement of the vane 15 at an angle of 90° to the lever 16 has the advantage that the forces tending to displace the vane 15 as a result of the blowing action of the air flowing out of the supply nozzles 7 and 8 is taken up practically completely by the lever 16 and the ball bearings 22. Moreover this arrangement is advantageous because for equal nozzle diameters the rise and fall of the pressure takes place very similarly, i.e. when the pressure in pipe 11 increases due to the vane 15 in FIG. 3 being moved upwardly the pressure in the pipe 12 decreases to the same extent and vice versa. The vane 15 has no restoring forces acting on it since it is moved exactly at right angles to the direction of flow of the compressed air. The journalling of the lever 16 by means of the pin 17 in the ball bearings 22 further improves the easy movement of the vane 15. The ball bearings 22 are adjustable by means of screws 23 so as to be free from play in order to effect absolutely accurate movement of the vane 15. The lock nuts 24 secure the screws 23 against unwanted displacement.

The movement of the lever 16 with the vane 15 is, in this embodiment, effected by a feeler 26 which bears on a template 25. The feeler 26 is screwed into a member 28 resting on a point 27. The flat surface 29 of the member 28 acts against a plate 30 of the lever 31 when it is deflected about the point 27. In this manner if the feeler 26 is swung in any direction it always presses against the lever 31 and moves it in accordance with the deflection of the feeler 26. Since the lever 31 is rotatably mounted with low friction on a pin 33 by means of ball bearings 32, the cup-shaped end 34 of the lever 31 is moved upon each deflection of the member 28 by the feeler 26. The cup 34 is operatively connected by a presser pin 35 to the lever 16 so that the displacement of the feeler 26 is transmitted to the vane 15. A spring 36 presses the lever system against the member 28 and thereby effects its return movement.

A piston 37 serves to influence the vane 15 via a pin 38 in the same manner as the feeler 26 as soon as a pressure impulse become effective through a pipe connection 39. This procedure results in the slide moving in the direction away from the template 25.

Clearly, instead of the oil cylinder according to FIG. 5 or the oil-operated turbine according to FIG. 6, other suitable driving devices or the like can be controlled by the control mechanism according to the invention.

I claim:

1. Pneumatic control mechanism for machine tools or the like with static or dynamic drive of the parts to be moved or controlled, comprising two supply nozzles and two receiving nozzles arranged opposite to the supply nozzles, a movable control vane arranged between the supply and receiving nozzles, said control vane being displaceable substantially at right angles to a plane passing through the axis of the nozzles, and the control vane being provided with two oppositely directed control edges lying on a line substantially parallel with said plane.

2. Pneumatic control mechanism according to claim 1, in which a feeler is arranged to act on a lever journalled about an axis, the free end of the lever being connected by a presser pin to the lever, and said lever being capable to turn about a bearing axis, said control vane being arranged on the free end of said lever at an angle of 90°.

3. Pneumatic control mechanism according to claim 1, in which a feeler is arranged to act on a lever journalled about an axis, the free end of the lever being connected by a presser pin to the lever and said lever being capable to turn about a bearing axis, said control vane being arranged on the free end of said lever at an angle of 90°, and in which a return spring is provided and said lever carrying said control vane being provided with the return spring.

4. Pneumatic control mechanism according to claim 1, in which a feeler is arranged to act on a lever journalled about an axis, the free end of the lever being connected by a presser pin to the lever and said lever being capable to turn about a bearing axis, said control vane being arranged on the free end of said lever at an angle of 90°, and the head of feeler being journalled on a point suspension and having a surface which acts against a plate of said journalled lever when it is turned about said point suspension.

5. Pneumatic control mechanism according to claim 1, in which is piston is provided displaceable under the action of pressure impulses for actuating a lever, said lever being able to turn about a bearing axis, and said control vane being arranged on the free end of said lever at an angle of 90°.

6. Pneumatic control mechanism according to claim 1, in which a piston is provided displaceable under the action of pressure impulses for actuating a lever, said lever being able to turn about a bearing axis, and said control vane being arranged on the free end of said lever at an angle of 90°, and in which a diaphragm is provided so that said piston is sealed by means of the diaphragm.

References Cited in the file of this patent

UNITED STATES PATENTS

| 2,635,581 | Karig | Apr. 21, 1953 |

FOREIGN PATENTS

| 689,814 | France | June 2, 1930 |
| 458,823 | Great Britain | Dec. 28, 1936 |